United States Patent [19]

Seyller

[11] Patent Number: 4,996,768
[45] Date of Patent: Mar. 5, 1991

[54] CAMSHAFT INSTALLATION METHOD

[76] Inventor: Albert F. Seyller, 8737 Central Ave., Oak Lawn, Ill. 60453

[21] Appl. No.: 505,160

[22] Filed: Apr. 5, 1990

[51] Int. Cl.$^5$ .............................................. B23P 15/00
[52] U.S. Cl. ................... 29/888.01; 29/888.1; 29/464; 74/567
[58] Field of Search ................ 29/888.1, 88.01, 271, 29/464, 281.6, 744, 889.2; 74/567, 595; 123/90.6

[56] References Cited

U.S. PATENT DOCUMENTS

| | | |
|---|---|---|
| 2,370,017 | 1/1944 | Delvaux, Sr. |
| 2,920,595 | 1/1960 | Gertz ................................ 29/744 |
| 3,979,811 | 9/1976 | Kammeraad ..................... 29/888.1 |
| 4,212,098 | 7/1980 | Sand .................................. 29/464 |
| 4,450,609 | 5/1984 | Hamilton ....................... 29/888.1 |
| 4,558,504 | 12/1985 | LePargneux et al. ........... 29/464 |
| 4,624,156 | 11/1986 | Kamata ............................ 74/595 |
| 4,628,575 | 12/1986 | Klufas et al. |
| 4,706,353 | 11/1987 | Zgliczynski et al. ........... 29/464 |
| 4,817,258 | 4/1989 | Waters ............................. 29/271 |

FOREIGN PATENT DOCUMENTS 58-0102635 6/1983 Japan ................................. 29/464

Primary Examiner—P. W. Echols
Assistant Examiner—Irene Cuda
Attorney, Agent, or Firm—Hill, Van Santen, Steadman & Simpson

[57] ABSTRACT

A method for guiding a camshaft into place in an engine includes using a tool which includes a cylindrical sleeve or body having a smooth outer surface of slightly smaller diameter or no larger than the bearing surfaces of the camshaft. An alignment pin having a conical shaped end extends through a central opening in the cylindrical body so that the conical end engages a center bore in the end face of the camshaft. The tool is held in place by a magnet mounted in the camshaft engaging end of the body. Various size bodies corresponding to the different sizes of bearing surfaces on different camshafts are provided, as well as a method for the installation of camshaft using the present apparatus.

2 Claims, 1 Drawing Sheet

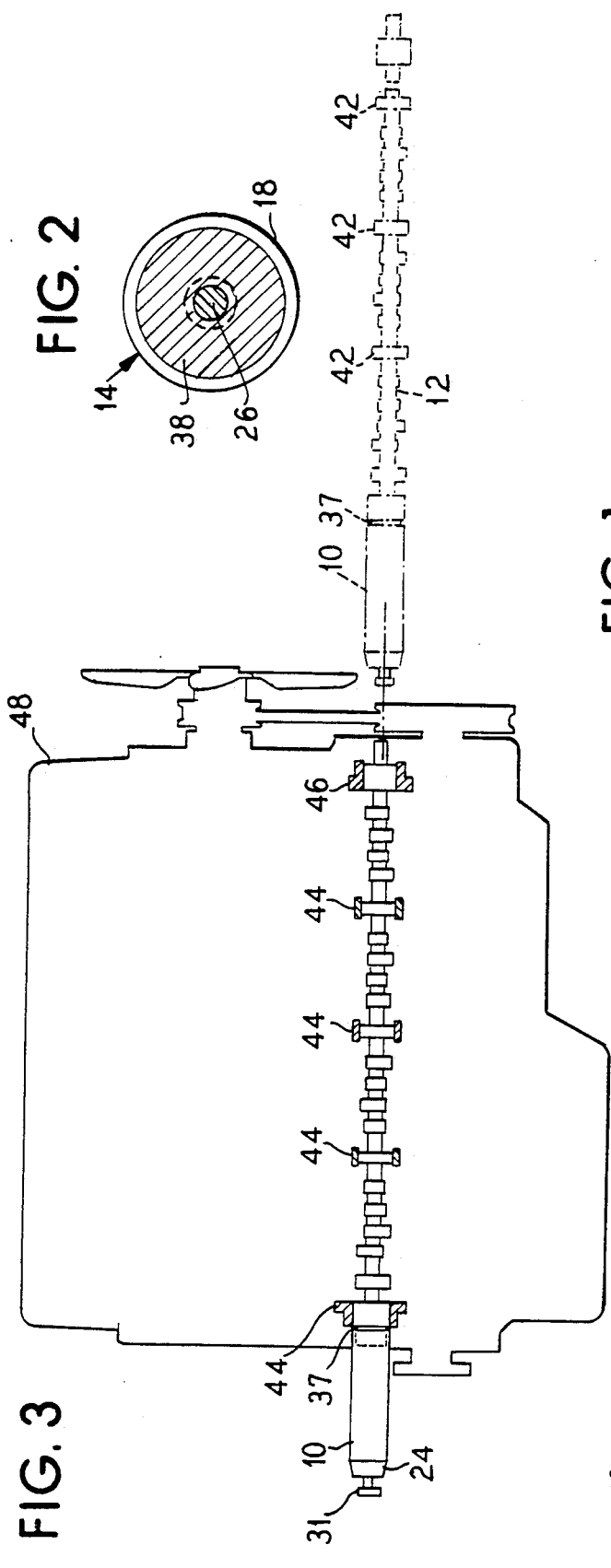

CAMSHAFT INSTALLATION METHOD

Background of the Invention

The present invention relates generally to a device for installing camshafts in internal combustion engines and the like, and to a method for its use.

DESCRIPTION OF THE RELATED ART

During rebuilding of an internal combustion engine or during an initial assembly of a new engine, the camshaft frequently must be installed into position such as by being guided into place along the corresponding engine bore. The current practice for installation of a camshaft is to guide the elongated camshaft into the engine bore by hand. When in place, the camshaft is supported on bearing surfaces of a soft bearing material.

Since the camshaft is relatively long and heavy, it is difficult to handle and, thus, guiding of the camshaft into place by hand frequently results in damage to the bearing surfaces, even if great care is taken during the installation. Such damage is generally the result of the steel camshaft striking the soft material of the bearings. To keep the damage to a minimum, installation by hand is performed slowly and so requires a relatively long period of time.

In the past, the installation of a camshaft into an engine has been aided through the use of a handle which fits on the end of the camshaft. This handle, however, still requires guidance of the camshaft by hand and thus does not prevent damage to the bearing surfaces nor much reduce the relatively long time required for installation.

U.S. Pat. No. 4,450,609 discloses a method of installing a camshaft with a removable sleeve positioned around a portion of the camshaft between at least one set of adjacent camshaft bearing journals. The sleeve has an outer surface which does not extend past the outer surface of the two adjacent journals and presents a continuous cylinder spanning the space between adjacent cam bearings to assist in installation of the sleeve is removed. Since the sleeve is mounted around the camshaft into an engine. After installation into the engine, the camshaft between two journals on the camshaft, disassembly of the engine to remove the sleeve after installation of the camshaft is required.

SUMMARY OF THE INVENTION

An object of the present invention is to easily guide a camshaft into place in an engine without damage to the bearing surfaces or the camshaft.

Another object of the invention is to reduce the time required for installation of a camshaft in an engine.

A further object of the invention is to provide a camshaft installation tool or guide which is easy to mount on a camshaft and easy to remove after installation.

Yet another object of the invention is to provide a camshaft installation guide which is easily adaptable to different sizes and configurations of camshafts and engines and which facilitates installation and alignment of cam bearings.

These and other objects and advantages of the invention are achieved by a device including a body or sleeve of a cylindrical configuration having a smooth outer surface of slightly smaller diameter than the inside diameter of the bearing surfaces on which the camshaft rides. The cylindrical body or sleeve includes a camshaft engaging face at one end which is mountable on to an end, such as the back end, of the camshaft. An opposite end of the cylindrical body is preferably tapered to ease initial insertion of the device into the camshaft bore in the engine.

An alignment means for aligning the body or sleeve on the rotational axis of the camshaft when mounted thereon is also provided, as well as an attachment means for mounting the body on the camshaft. The alignment means includes a pin which extends through a central opening along the axis of the cylindrical body and has a tapered end extending from the camshaft engaging face of the body. This tapered end of the alignment pin fits into an opening found on the end face of every camshaft. Since the opening o the end of the camshaft is on the rotational axis of the camshaft, the alignment pin assures that the cylindrical body is in alignment with the camshaft.

The attachment means includes a magnet mounted in the body which magnetically engages the end face of the camshaft. The magnetic attachment means is thus easily mountable on the camshaft and easily removable therefrom. Since the magnet is more effective for holding the body on the camshaft in an axial direction and less effective at resisting forces in a lateral direction, the alignment pin also forms a part of the attachment mean by resisting lateral forces.

It is contemplated to provide a camshaft installation kit in accordance with the present invention. The installation kit includes an alignment pin, at least one attachment magnet, and as many different sizes of cylindrical bodies or sleeves, also referred to as installation bodies, as needed for the installation of different sizes of camshafts into different types of engines. The alignment pin, and preferably also the attachment magnet, is interchangeable between the different sizes of cylindrical bodies. The purchaser of such an installation kit may specify the types of engines or the sizes of camshafts to be installed, and would be provided with the appropriate sizes of installation bodies for those engines or camshafts, along with a universal alignment pin and magnet. For commercial garages, the installation kit may include all available sizes of installation bodies. It is, of course, possible that each different installation body may be provided with a permanently mounted magnet, and possibly its own alignment pin as well.

A method for installation of a camshaft into an engine using the apparatus of the present invention is also provided, wherein proper alignment of the bearings is easily achieved and the camshaft is installed quickly and easily without damage to the bearing surfaces.

BRIEF DESCRIPTION OF THE DRAWINGS

FIG. 1 is a side elevational view, partially in cross section, of the present camshaft installation tool installed on an end face of a camshaft;

FIG. 2 is a cross section along line II—II of FIG. 1 showing an attachment end of the present camshaft installation tool; and FIG. 3 is a schematic diagram of a camshaft being installed into an internal combustion engine using the camshaft installation tool in accordance with the principles of the present invention.

DESCRIPTION OF THE PREFERRED EMBODIMENTS

Referring first to FIG. 1, a camshaft installation tool 10 is shown mounted on an end of a camshaft 12. The camshaft installation tool includes a body, or sleeve, 14 of a generally cylindrical configuration having a central opening 16 extending axially through the body 14. The central opening 16 is open at both ends of the body 14. The body 14 has a smooth outer surface 18 and first and second opposite ends 20 and 22, respectively. The outer surface 18 is smooth and continuous and is of a diameter that is slightly smaller than the inside diameter of the bearings on which the camshaft rides and no larger than the cam journal bearing surfaces. In one example, the outer surface is 0.002 to 0.050 inch less in diameter than the camshaft bearing surfaces, and preferably 0.002 to 0.007 inch less in diameter. Thus, the outer diameter is per application. The outer surface 18 may be provided with a coating or a surface treatment including, for example, teflon, chrome, or anodizing.

The body 14 is of a length at least sufficient to span the distance between the two adjacent bearings in the camshaft bore of the engine which are spaced fartherest apart. This insures that the camshaft 12 is guided into the camshaft bore in alignment, since the camshaft and tool combination is, thus, always supported on at least two bearing surfaces.

The end 22 of the body 14, which is the introduction end of the body, is provided with a taper 24, which in a preferred embodiment is a 5° to 30° taper. The taper 24 aids in starting the introduction of the device 10 into the camshaft bore of the engine. It is contemplated that other shapes of introduction ends may alternately be provided.

The body 14 of the illustrated embodiment is generally solid except for the central opening 16, and is of a material which is light in weight and generally easy to handle. For example, the preferred material of the body 14 is aluminum which is anodizeable and, as will be discussed hereinafter, non-ferrous. To save weight and material, the body may have interior openings or hollows, as desired.

An alignment means 26 in the preferred embodiment is an elongated pin or shaft which extends through the central opening 16 and is adjustably mounted within the body 14. The alignment pin 26 has a threaded portion 28 which threadably engages a corresponding threaded portion 30 in the opening 16. The cooperating threads enable the alignment pin 26 to be incrementally adjusted in an axial direction relative to the body 14 simply by rotating the pin 26.

An adjustment means 31 in the form of a knob having, preferably, a knurled outer surface is provided at an end 32 of the alignment pin 26. Rotation of the knob 31 thus axially adjusts the alignment pin 26 in the body 14. The knob 31 may either be formed in one piece with the alignment pin 26 or may be press fit thereon or otherwise affixed thereto.

Opposite the end 32 of the alignment pin 26 is a pointed or tapered end 34 which has a generally conical end surface. The alignment pin 26 is of a sufficient length that the tapered end 34 thereof extends beyond the end 20 of the body 14 when the threaded portions 28 and 30 are threaded together. Since each camshaft 12 is provided with a center bore 36 on the rear face 37, the conically shaped end 34 centers the body 14 relative to the bore 36. The center bore 36 on many camshafts 12 have a conical opening, into which the tapered end 34 extends. Preferably, the tapered end 34 is tapered at an angle of 30° relative to the axis of the alignment pin 26. The tapered end 34 is also preferably induction hardened or otherwise treated to resist deformation.

By threadably adjusting the alignment pin 26 into the center bore 36, the body 14 is centered on the end face 37 of the camshaft 12. The tapered end 34 of the alignment pin 26, if the body 14 is not in the centered position relative to the camshaft 12, urges the body 14 laterally until the tapered end 34 seats in the center bore 36. The tapered end 34 extending in the center bore 36 then resists lateral movement of the body 14 on the camshaft 12 so that the center position is maintained.

The body 14 is attached to the rear face 37 of the camshaft 12 by an attachment means 38 in the form of a magnet. The magnet 38, which may either be a permanent magnet or an electro-magnet and which may be of a variety of different shapes and sizes, magnetically couples the body 14 to the camshaft 12 during use of the present installation tool 10. In the illustrated embodiment, the body 14 has a recess 40 into which the magnet 38 is mounted.

As can be seen with reference to FIG. 2, the magnet 38 is of an annular configuration with a central opening through which the alignment pin 26 extends. The magnet 38 may be mounted in the body, or on the end thereof, by a variety of mounting means. For example, the magnet may be press fit into the recess 40, held in place by glue or adhesive, held in place by a set screw (not shown) or the like or by a retaining clip (not shown). The use of magnets having other than an annular configuration is also contemplated.

One embodiment of the present device has the attachment magnet 38 permanently affixed in the body 14. Alternately, by removably mounting the attachment magnet 38 in the body 14, it becomes possible to use the same magnet 38 in different sizes of bodies 14 as needed for different engines. For this reason, a non-ferrous material for the body 14 enables the attachment magnet 38 to be changed more easily since the magnet does not magnetically affix itself to the, for example, aluminum body. It is possible in some embodiments, however, that the magnetic attraction between the attachment magnet 38 and the ferrous metal of the alignment pin 26 may be enough to hold the magnet 38 in place.

The magnetic attachment means 38 is easy to attach to the camshaft 12 by simply placing the magnet 38 against the end face 37 of the body. The magnet 38 is also easy to remove by pushing laterally on the device 10 to apply torque to the magnetic connection. By providing a high strength industrial magnet as the attachment magnet 38, the device 10 is held securely to the camshaft 12. One example of such high strength industrial magnet is in three parts, which reinforces the magnetic pull of the combined magnets. The magnetic attraction of such magnets is such that removal from the end face 37 of the camshaft 12 by pulling is quit difficult, and the application of a torque force is required for removal.

It is envisioned in conjunction with the present apparatus to provide an installation kit for camshafts of different sizes. The installation kit would include a single alignment pin 26 of a universal length. In other words, the alignment pin 26 is sufficiently long to extend from both ends of the longest installation body 14 to be provided. It is preferred to provide a single magnet 38 which is removably mounted in each of a plurality of different bodies 14. The bodies 14 are of different sizes corresponding to the different sizes of camshafts 12, both in diameter and in length, wherein the length corresponds to the distance between the two fartherest spaced bearing journals 42 on the camshaft 12. While it is possible that the installation kit may include a body 14 for each of the different sizes of camshafts 12, it is more economical for the installation kit to be provided only with the different body sizes required by the user of that particular kit.

Following is a table of cam journal diameters for various engine makes. The engines are listed by engine displacement in cubic inches and the cam journal diameters are listed in inches.

| ENGINE MAKE | ENGINE SIZE (straight bore only) | CAM JOURNAL DIAMETERS |
| --- | --- | --- |
| BUICK | 181, 196, 231, 252, | 1.785 |
|  | 350, 400, 455 | 1.868 |
|  | 430, 455, 250, 262, |  |
| CADILLAC | 368, 390, 429, 425, | 1.750 |
|  | 500, |  |
| CHEVROLET-V6 & V8 | 200, 229, 262, 265, | 1.868 |
|  | 283, 327, | 1.948 |
|  | 350, 400, 348, 409, |  |
|  | 366, 396, 402, 427, |  |
|  | 454, |  |
| FORD | 292, 312, | 1.925 |
|  | 332, 352, 360, 390, | 2.123 |
|  | 406, 427, 428, | 2.264 |
|  | 383, 462, | 2.123 |
|  | 429, 460, |  |
| OLDSMOBILE | 371, 394, | 1.997 |
| PONTIAC | 326, 350, 389, | 1.889 |
|  | 400, 421, 455, |  |

The present invention also provides a method for the installation of camshafts 12 and their bearings 44. The method will be described in conjunction with the schematic diagram of FIG. 3. In particular, the method includes the steps of: installing all cam bearings 44 except for the front bearing 46 in the engine 48; attaching the installation tool 10 to the rear surface 37 of the camshaft 12 to be installed using the magnetic coupling between the attachment magnet 38 and the ferrous material of the camshaft 12; aligning the installation tool 10 with the center bore 36 by threadably adjusting the alignment pin 26 until the tool 10 is centered relative to the bearing journals 42.

The further steps include inserting the camshaft 12 with the attached tool 12 into the engine block 48, as shown in FIG. 3, by first guiding the tapered end 24 of the tool 10 into the cam bore of the engine 48 and urging the camshaft 12 and attached tool 10 into the engine 48 so that the tool 10 spans at least two bearing surfaces 44 and 46 before the end 37 of the camshaft 12 enters the engine 48. After being inserted all the way in, the camshaft 12 is then checked for free rotation and is subsequently removed along with the tool 10 from the engine 48 so that the front cam bearing 46 may be installed. The camshaft 12 is then lubricated and the installation step is repeated using the attached tool 10 as a guide to install the camshaft 12 into the final position in the engine 48. The camshaft 12 is then checked for free rotation and if required the steps of removing and reinserting are again repeated. Once the camshaft 12 is mounted in the engine 48 in a freely rotating position with all bearings 44 and 46 in alignment. The installation tool 10, which now extends from the end of the engine 48 as shown in FIG. 3 is removed from the camshaft 12 by breaking the magnetic hold. This is easily accomplished by simply pressing laterally on the tool to break the magnetic bond between the tool 10 and the camshaft 12.

To support the camshaft during installation, it is contemplated to provide an external support for the unsupported end of the camshaft at the side of the engine from which the camshaft is installed. Such support may include a cradle, a tube, or a table generally in line with the camshaft bore. This would relieve the installer of supporting the camshaft during installation.

Thus, there is shown and described an installation tool 10 for camshafts 12 which prevents damage to the bearing surfaces 44 and 46, and the camshaft itself is easily installed and removed from the camshaft 12, and is readily adaptable to different sizes of bearing journals 42. The present device 10 is easy to use, simple in construction, and effective in speeding up the installation process for camshafts.

Although other modifications and changes may be suggested by those skilled in the art, it is the intention of the inventor to embody within the patent warranted hereon all changes and modifications as reasonably and properly come within the scope of my contribution to the art.

I claim:

1. A method for installing a camshaft in an engine, comprising the steps of:
   attaching an installation tool to an end of a camshaft;
   aligning said installation tool with an axis of the camshaft;
   inserting said installation tool into an engine with the camshaft attached thereto;
   using said installation tool as a guide while urging the camshaft into a fully installed position, said installation tool extending from the engine when the camshaft is in the fully installed position; and
   removing said installation tool from the camshaft.

2. A method as claimed in claim 1, wherein said step of attaching includes magnetically attaching said installation tool, and said step of removing includes removing the magnetic attachment.

* * * * *